Patented July 26, 1938

2,124,895

UNITED STATES PATENT OFFICE 2,124,895

METHOD OF PREPARING PINEAPPLE

Henri Daniel Rey, Papeete, Tahiti, assignor to The Anglo California National Bank of San Francisco, trustee, San Francisco, Calif., a corporation No Drawing. Application July 6, 1936, Serial No. 89,131

4 Claims. (Cl. 99—204)

This invention relates to the drying of fruit and subsequent mechanical manipulation to secure a soft, pliable fruit body in which the residue juices and syrups are distributed substantially evenly throughout the body and which will so remain for a long period of time (all as generally set out in my copending patent applications filed under Serial Nos. 68,885, 73,699, 82,833, 82,834, 82,835 and 86,417) as compared to the keeping qualities of ordinary dried fruits of commerce which are frequently hard and knotty in spots as soon as made and in comparatively short time become extremely hard and refractory, as well as incrusted with dried fruit sugars and other matters, and disagreeable to the eye.

The principal object of the present invention is to provide improvements in a method as outlined, which will be particularly applicable in the preparation of dried pineapple, as this fruit due to its large juice content and physical properties, is not amenable to treatment of the processes set out in my copending applications referred to without important modifications if the best results are to be obtained. Other objects and advantages of the invention will appear in the following description.

In applying my process to pineapples, well ripened fruit is preferably selected, the heavy knotty skin or rind is cut off, and the fruit is sliced or cut into slabs about ½ or ¾ inch in thickness, preferably crosswise of the fruit, and placed in a dryer where the moisture is evaporated until the fruit slabs have shrunk about ¼ to ⅓ so as to have become toughened on their outsides to permit handling and squeezing without easy breaking of the outer layers. This preliminary drying step may be carried out in ovens in a current of air heated to a temperature between about 100 to 200 degrees Fahrenheit, in practice about 130 degrees Fahrenheit maintained for about eight hours having been found satisfactory, though the actual time will depend to some extent on the humidity of the heated drying air employed as well as the volume passed over and around the fruit slabs.

After the fruit slabs have been dried to the preliminary "surface tough" condition, the slabs are removed from the drier and placed in a press or between two flat blocks and pressure is applied to compress the fruit slabs to about ¾ of their thickness. Preferably the upper pressure block is rocked in various directions upon the fruit slab for a few moments to loosen up the fibers and cells for reabsorption of juices from the inner parts of the slabs as well as condensed juices from the rind portions previously pared from the pineapple, as explained below. The pressure application may be repeated after an interval if desired.

During the preliminary drying step described, the skin or outer portion of the pineapple which was cut off, is run through a fruit press to extract most all of the juice, and the expressed juice is boiled down to about half its volume (sugar being added where the fruit is not ripe enough or quite sweet enough) and while this juice is hot the previously pressed or manipulated slabs of partially dried fruit are immersed into the juice for a few moments, swell slightly and absorb what they will, then drained for a few minutes and returned to the drying chamber or tunnel and again subjected to a current of hot air as before until the fruit slabs are further reduced in thickness, generally to about ½ or ⅓ of their original raw thickness.

This second drying step may be carried out in from 10 to 14 hours, and may terminate with a rise in temperature to about 200 for a few minutes to insure thorough sterilization just before the fruit is packed.

The slabs of fruit as treated are then packed in any suitable manner to prevent free access of air, generally in wax paper or water proof "Cellophane" lined boxes for the trade. For the better trade, each slab may be separately Cellophane wrapped, if desired, to further enhance the appearance as well as keeping quality of the product.

The absorption by the slabs of the juices expressed from the rind of the fruit brings into the dried product a flavor and quality which would otherwise be lost as the rind portions of the fruit carry a much higher percentage of flavor and aromatics which gives the fruit its most desirable characteristics, and the mechanical working of the fruit carried out in the manner described breaks down the fiber or disrupts it in some manner to cause a substantially permanent and even dissemination of the juices so that the slabs remain soft and juicy for periods of time to meet all trade requirements to a degree not heretofore obtainable.

Also, instead of using the juice from the rind of the pared fruit, I may use juices from fruits of the same character, although the juice from the rind is preferable.

Having thus described my invention what I claim is:

1. The method of preparing pineapple which comprises paring and cutting the fresh pineapple into relatively thick slabs, subjecting the pared slabs to a preliminary drying step until their outer surfaces are toughened, then applying pressure to the slabs between hard surfaces together with a rocking motion sufficient only to loosen the fibers of the fruit and distribute the remaining juices therein, and thereafter subjecting the slabs to a further drying step until reduced to stabilized condition of dryness for packing, all while maintaining the individuality of the slabs.

2. The method of preparing pineapple which comprises paring and cutting the fresh pineapple into relatively thick slabs, subjecting the pared slabs to a preliminary drying step until their outer surfaces are toughened, then applying pressure to the slabs between hard surfaces together with a rocking motion sufficient only to loosen the fibers of the fruit and distribute the remaining juices therein, and thereafter subjecting the slabs to a further drying step until reduced to stabilized condition for packing, all while maintaining the individuality of the slabs, the drying steps being carried out in a current of air at a temperature of about 130 degrees Fahrenheit and terminating with a raised sterilizing heat for a relatively short duration.

3. The step in the drying of fresh pineapple cut in relatively thick slabs which comprises applying pressure to the partially dried slabs sufficient only to disrupt the fibers of the same and distribute the remaining juices therein, all while maintaining the individuality of the slabs in substantially their original general shape, and thereafter applying a further drying step.

4. The method of preparing pineapple which comprises paring and cutting the fresh pineapple into relatively thick slabs, subjecting the pared slabs to a preliminary drying step until their outer surfaces are toughened, then applying pressure to the slabs sufficient only to disrupt the fibers of the same and to force the juices from the interior of the slab to the surface, then subjecting the slabs to a further drying step, then causing the slabs to absorb additional juices expressed from fresh pineapple parings, and thereafter subjecting the slabs to another drying step until reduced to stabilized condition of dryness for packing, all while maintaining the individuality of the slabs.

HENRI DANIEL REY.